June 24, 1952 I. NESSON 2,601,664
DEICING WIPER BLADE FOR CURVED WINDSHIELDS
Filed June 8, 1950 3 Sheets-Sheet 2
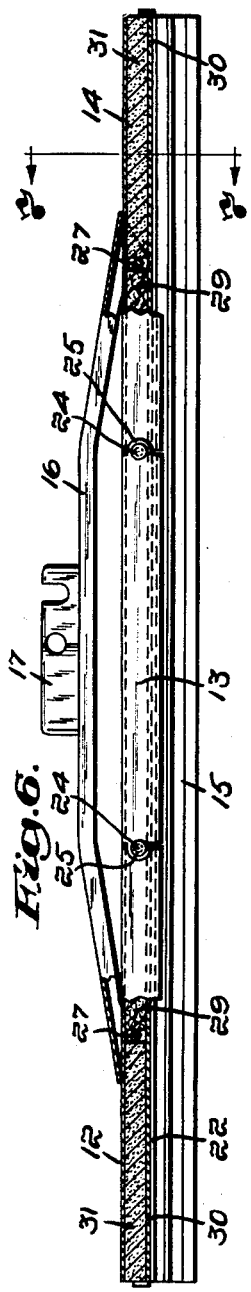
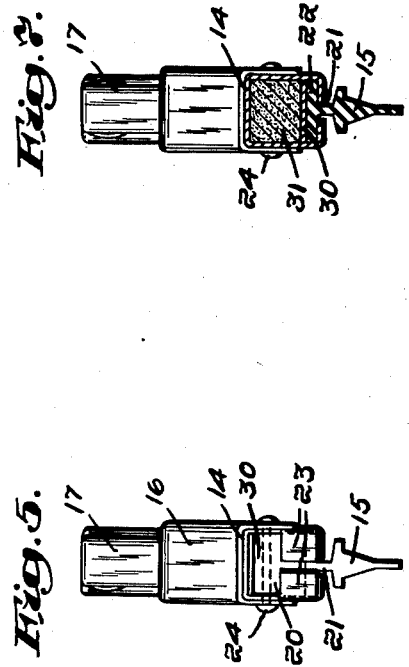
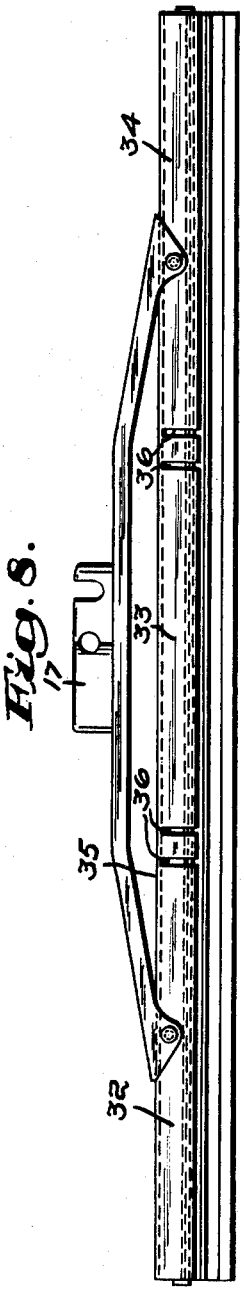
Inventor:
Israel Nesson,
by Thomson & Thomson
Attorneys June 24, 1952     I. NESSON     2,601,664
DEICING WIPER BLADE FOR CURVED WINDSHIELDS
Filed June 8, 1950     3 Sheets-Sheet 3
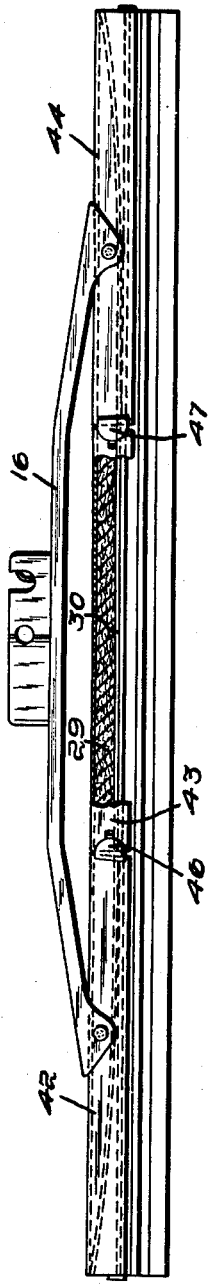
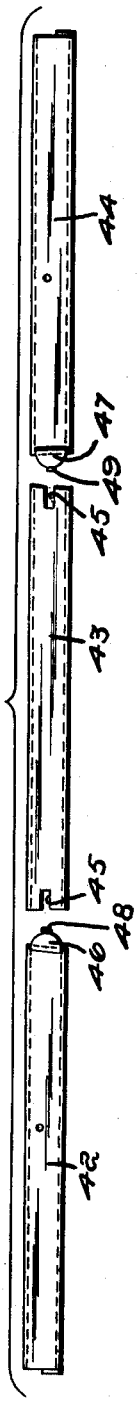
Inventor:
Israel Nesson,
by Thomson & Thomson
Attorneys Patented June 24, 1952

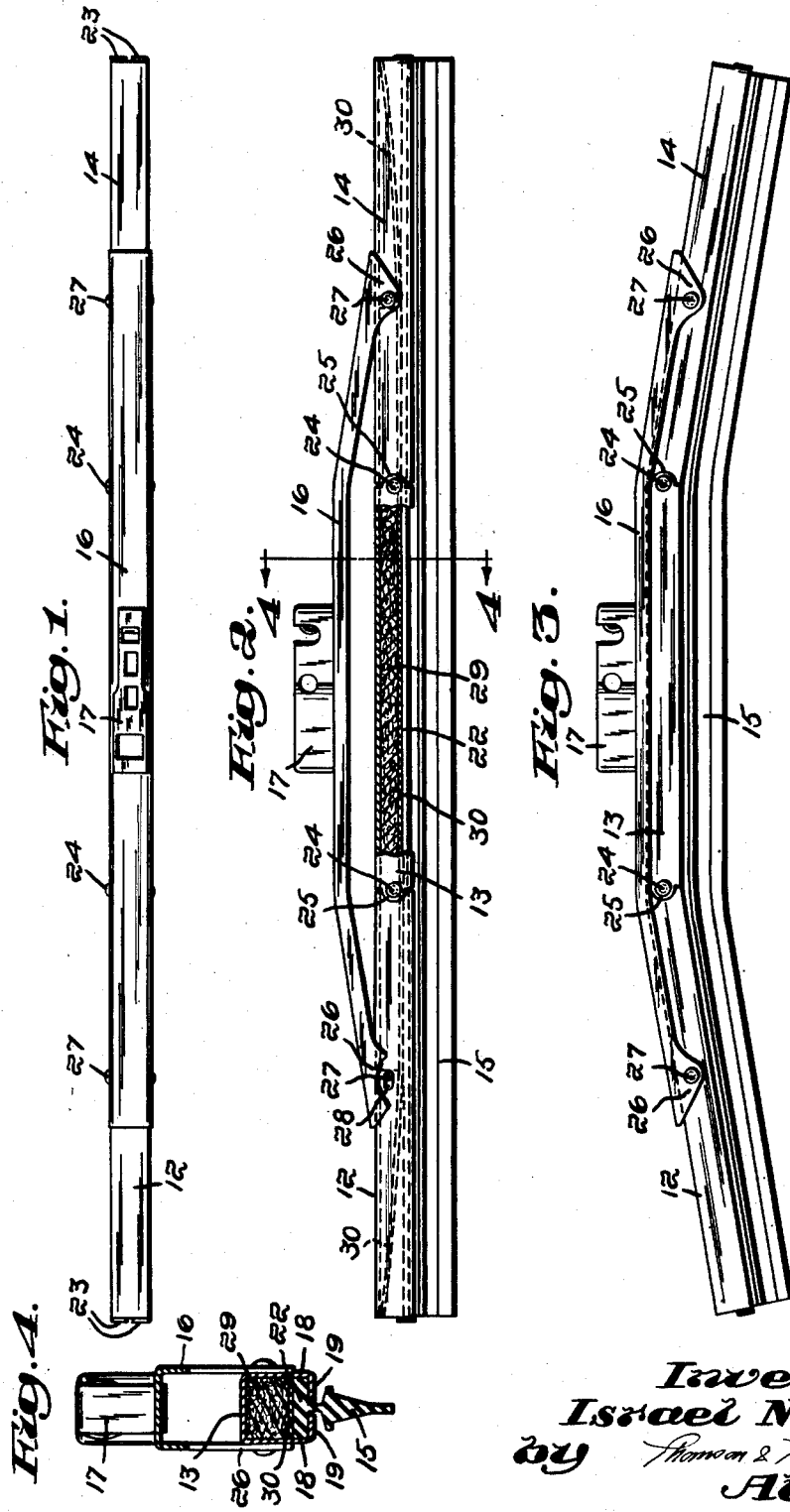

2,601,664

UNITED STATES PATENT OFFICE 2,601,664

DEICING WIPER BLADE FOR CURVED WINDSHIELDS

Israel Nesson, Lynn, Mass., assignor to Max Zaiger, Swampscott, Mass.

Application June 8, 1950, Serial No. 166,786

10 Claims. (Cl. 15—250.3)

This invention relates to wiper blades for curved windshields, and pertains more particularly to improvements in the holders for flexible rubber wiper strips adapted for cleaning the curved glass panes of automobile windshields.

I am aware that various types of flexible wiper blades have heretofore been provided for use on curved windshields. Many of such blades are either inefficient in use or complicated, and expensive to manufacture, and all of them are ineffective in freezing temperatures. Under conditions of wet snow, sleet or freezing rain, the rubber wiper strip and hinge joints of the flexible blade holder tend to freeze in set position and the wiper strip cannot follow the curve of the windshield during wiping operation, with the result that portions of the windshield are not wiped clean of moisture or frost, and become blurred.

It is accordingly the principal purpose of the present invention to obviate these objections to the conventional curved blade by providing a flexible wiper blade having self-contained means for unfreezing the flexible wiper strip and the frozen joints of the blade holder, thus ensuring that the blade maintains its flexibility and conforms to the contour of the curved windshield during operation of the wiper.

Another object of the invention is to improve the construction of the blade holder, to provide a flexible holder which is simple and economical to manufacture and durable and efficient in use.

The novel features of the improved blade will be apparent from the following description of the several embodiments of this invention illustrated on the accompanying drawings, and will be pointed out in the appended claims. It will be understood, however, that the structural details of the wiper blade herein illustrated and described may be varied to suit particular purposes without departing from the essence of the invention, as set forth in the claims. It will also be understood that the improved wiper blade may be used on straight or flat windshields, as well as on curved panes.

In the drawings:

Fig. 1 is a plan view of the improved wiper blade;

Fig. 2 is a side elevation thereof, partly broken away and in section, the blade being in the normal straight position assumed when not in use;

Fig. 3 is a side elevation of the blade when curved to conform to the contour of the windshield, in effective use;

Fig. 4 is an enlarged section on line 4—4 of Fig. 2;

Fig. 5 is an enlarged end view looking to the right of Fig. 2;

Fig. 6 is a side elevation, partly broken away and in section, showing a modification of the blade illustrated in Figs. 1 to 5;

Fig. 7 is an enlarged section on line 7—7 of Fig. 6;

Fig. 8 is a side elevation of a wiper blade having a modified form of blade holder;

Fig. 9 is a view similar to Fig. 2, illustrating a further modification of the blade holder construction;

Fig. 10 is a side elevation, showing the blade holder elements of Fig. 9 in separated position; and Fig. 11 is a bottom view of Fig. 10.

In the particular embodiment chosen for the purpose of illustration shown in Figs. 1 to 5, the improved windshield wiper blade comprises a metal holder or shell indicated generally at 11 in Fig. 2 and consisting of three separate sections 12, 13 and 14, pivotally connected in longitudinal alignment; a rubber wiper strip 15 carried by the sectional holder 11; a yoke or saddle member 16, pivotally attached to the end sections 12 and 14, respectively, and bridging the center section 13; and a clip or connector 17, secured to the center of the yoke and adapted for attachment to the outer end of any conventional windshield wiper arm (not shown) for reciprocating the blade over a curved windshield.

Each section of the pivoted or flexible blade holder preferably consists of a sheet metal channel member having parallel sides 18 depending from its flat top, and inwardly bent bottom flanges 19, providing an interior longitudinal chamber or channel 20 (Fig. 5) of substantial depth. The opposed edges of the bottom flanges 19 are spaced apart sufficiently to provide a longitudinal slot for receiving the reduced neck 21 of the rubber wiper strip 15, when the top bead 22 of the strip is slid endwise into the aligned channels 20 of the respective shell sections 12, 13 and 14, so that it fits loosely in said channels. The loose-fitting rubber strip may be retained in the sectional holder by inwardly bent end tabs 23, integral with the outer ends of the respective end sections 12 and 14. In this respect, each section of the improved holder of the wiper blade is formed substantially as shown in my co-pending application Serial No. 93,009, filed May 13, 1949, for Windshield Wiper Blade.

The aligned sections of the blade holder are pivotally interconnected by pins 24 or the like, extending transversely through the side walls of said sections at the hinged joints thereof. For this purpose, the center section 13 may have projecting ears 25 at its opposed ends, said ears overlapping corresponding ears (not shown) on the inner ends of the end sections 12 and 14, and the pivot pin may extend through the said ears at each of the joints. Hence, the respective sections of the flexible blade holder may swing angularly relative to each other in a transverse direction toward and from the windshield to curve the rubber wiper as indicated in Fig. 3, when the wiper strip 15 is pressed against a curved pane by the conventional, spring-tensioned wiper arm.

The yoke or saddle 16, consists of a strip of sheet metal, preferably of channel shape to strengthen the yoke and to provide channeled ends 26 which embrace the tops of the respective holder sections 12 and 14 and which are pivoted thereto by pins 27 or the like passing transversely through slots 28 in the sides of said sections, the slots permitting relative longitudinal movement between the yoke ends and said sections when the sectional holder is flexed as aforesaid. The end portions of the yoke are inclined with respect to the central portion thereof, to permit adequate flexing of the blade holder and wiper strip, as indicated in Fig. 3.

The clip or connector 17 is suitably secured to the top of the central portion of the yoke 16. The structural details of the connector are not material to the present invention, but the clip is preferably of a universal type as described in my co-pending application Serial No. 72,569, filed January 25, 1949, for Wiper Blade Clip.

In accordance with the principal purpose of this invention, a strip of absorbent material 29, such as felt or the like, is preferably inserted in the channel 20 of the center section 13, above the bead 22 of the rubber wiper strip, and the ends of the felt strip preferably extend into the adjacent channels of the end sections 12 and 14, for example to the extent indicated in Fig. 6 where the ends of the felt strip terminate at the yoke pivots 27, respectively. A flat strip 30 of spring steel preferably somewhat narrower than the width of the channels 20, is inserted into the aligned channels of the holder sections, so that it lies between the absorbent strip 29 and the bead 22 of the rubber wiper (Figs. 2 and 4) and extends from end to end of the sectional holder. The opposite ends of the spring strip bear against the tops of the empty channels of the end sections 12 and 14, as indicated in broken lines in Fig. 2, so that the pivoted sections of the wiper blade are normally held in alignment as shown in said figure. The spring yields to operative pressure on the wiper blade, whereby the rubber strip may flex as aforesaid to conform to the surface of a curved windshield.

The absorbent strip 29 is substantially saturated with a liquid of low freezing point, preferably a non-volatile liquid such as a salt solution or glycerine, before it is inserted in the channel of the blade holder. Optionally, the absorbent strip or pad may be inserted in a dry condition and soaked with the anti-freeze liquid by squirting the liquid into the empty channels or reservoirs at the outer ends of the holder sections 12 and 14; and the pad 29 may be replenished with the liquid in this manner, whenever necessary, for the pad will absorb liquid squirted or otherwise deposited in said reservoirs.

When the wiper blade equipped with the absorbent strip or pad 29, containing a liquid having a freezing point substantially below the freezing point of water, becomes bathed in rain or moisture resulting from melting snow or sleet, the anti-freeze in the moisture soaked pad is taken up by the rain water and continuously carried by flow, seepage and capillary action through the hinge joints of the holder sections, around the loose-fitting spring 30 and wiper bead 22 and through the slots in the bottoms of the holder sections, onto the wiper 15 and the windshield. The wiper blade is thus bathed in a solution of relatively low freezing point, so that the hinge joints of the holder are constantly lubricated with anti-freeze and will not become frozen and locked, and the rubber blade will not become stiffened by an ice coating, even though the temperature is below the freezing point of water.

Hence, the improved wiper blade is maintained in a freely flexible state under weather conditions which would cause the conventional flexible flexible blades to freeze and stiffen in set position. Moreover, the operation of the improved blade on the windshield bathes the glass surface with the anti-freeze liquid, thawing accumulated ice or frost and ensuring that the pane is wiped clean.

The absorbent strip 29 may, if desired, extend from end to end of the sectional holder 11, but it is preferred, as shown in the modification of Figs. 6 and 7, to insert salt blocks 31 in the outer ends or reservoirs of the channels 20 of the end sections 12 and 14 of the holder, between the top of the holder and the spring 30, which fits loosely in the channels, as aforesaid, to allow liquid from the moistened salt blocks (as well as liquid from the chemically treated absorbent strip 29) to seep around the side edges of the spring and wiper bead and through the bottom slot in the holder sections. If desired, the chemically treated absorbent strip 29 may be substituted by blocks of salt or other substance having a freezing point in solution below 32° F., in the holder sections.

In any of the forms herein disclosed, the improved blade holder comprises channeled sections providing interior compartments or channels for receiving the upper edge or bead of the rubber wiper strip, the normalizing spring 30 and a solid material containing a chemical substance, either liquid or crystalline, soluble in water, such as rain or melted snow or sleet, to reduce the freezing point of the solution which seeps out of the holder onto the rubber wiper strip and windshield.

In the modification shown in Fig. 8, the relatively movable sections 32, 33 and 34 of the channeled blade holder, have a common, integral top piece 35, and the hinge joints between the respective sections are formed by slotting the sides and bottom flanges of the channeled holder as indicated at 36. The holder sections are thus hingedly connected at the slots 36 to permit adequate flexibility of the blade holder, without providing separate sections pivotally interconnected by hinge pins or the like, as in Figs. 1 to 7. Other forms of hinged connections between the channeled holder sections may obviously be provided.

For example, in the further modification shown in Figs. 9 to 11, the blade holder comprises three separate sections 42, 43 and 44 removably connected at hinged joints provided by mutually interfitting formations on the opposed ends of the respective sections. Each of the sections is channel shaped, as in Figs. 1 to 8. The sides of the center section 43 have inwardly directed slots 45 in the respective ends thereof; and the adjacent ends of sections 42 and 44 have projecting ears 46 and 47, respectively, offset laterally to straddle the sides of the center section and provided with inwardly directed hooks 48 and 49, respectively, which are received in the slots 45 at the opposite ends of the center section. The hooks thus constitute pivots within said slots.

The opposed ends of the respective holder sections may be inclined downwardly and rearwardly as best shown in Fig. 10, to permit relative angular movement between the sections when they are assembled in hinged relation, as shown in Fig. 9. The sections are held in assembled relation by the yoke 16 which is pivoted to the end sections 42 and 44, respectively, and which restrains relative longitudinal movement between the connected sections. The sections are held against relative transverse movement by the ears 46 and 47 which embrace opposite ends of the center section 43, and by the spring 30 and absorbent pad 29 which are received in the channels of the holder sections as explained in connection with Figs. 1 to 6.

Except for the modifications of the hinge connection between the holder sections, the wiper blades of Fig. 8 and Figs. 9 to 11 are the same in construction and mode of operation as the blade of Figs. 1 to 6 inclusive.

A wiper blade constructed in accordance with this invention is simple and economical to manufacture and assemble, durable and efficient in use, and effectively obviates the disadvantages of a frozen wiper blade. The rubber wiper strip, the normalizing spring, and the antifreezing elements in the chambers or channels of the sectional holder, may be removed and replaced, if desired; and a dry, absorbent strip or pad may be replenished with liquid antifreeze in the manner previously explained.

I claim:

1. A windshield wiper blade comprising a channeled holder having aligned, flexibly jointed sections, each consisting of top, side and bottom walls defining an interior channel extending from end to end of the blade, the respective bottom walls having communicating, longitudinal slots for receiving the neck of a flexible wiper strip, a wiper strip having a bead loosely disposed in said channel and retained therein by said bottom walls, and a neck received in said slots, means flexibly interconnecting said sections for angular transverse movement relative to each other, a strip of material comprising a water soluble substance having a relatively low freezing point disposed in the channel of at least one of said holder sections intermediate the top wall thereof and said bead, and a saddle having its ends pivotally connected to the outermost sections of the holder.

2. A windshield wiper blade comprising a channeled holder having a plurality of separate, aligned, flexibly jointed sections, each consisting of substantially rigid top, side and bottom walls defining an interior channel extending from end to end of the blade, the respective bottom walls having communicating, longitudinal slots for receiving the neck of a flexible wiper strip, a wiper strip having a bead loosely disposed in the bottom of said channel and retained therein by said bottom walls, and a neck received in said slots, means pivotally interconnecting said sections for angular transverse movement relative to each other, a strip of material comprising a water soluble substance having a relatively low freezing point disposed in the channel of at least one of said holder sections between said bead and the top wall of said section, and a saddle having its ends pivotally connected to the outermost sections of the holder.

3. A windshield wiper blade comprising a channeled holder having three separate, aligned, flexibly jointed sections, each consisting of substantially rigid top, side and bottom walls defining an interior channel extending from end to end of the blade, the respective bottom walls having communicating, longitudinal slots for receiving the neck of a flexible wiper strip, a wiper strip having a bead loosely disposed in the bottom of said channel and retained therein by said bottom walls, and a neck received in said slots, means pivotally interconnecting said sections for angular transverse movement relative to each other, a strip of material comprising a water soluble substance having a relatively low freezing point disposed in the channel of the center section and having its opposite ends projecting into the channels of the end sections, between said bead and the top wall of said sections, and a saddle having its ends pivotally connected to the outermost sections of the holder.

4. A windshield wiper blade comprising a channeled holder having three substantially rigid, elongate, aligned sections, each consisting of top, side and bottom walls defining an interior channel extending from end to end of the blade, the respective bottom walls having communicating, longitudinal slots for receiving the neck of a flexible wiper strip, a wiper strip having a bead disposed in the bottom of said channel, and a neck received in said slots, means pivotally interconnecting the adjacent ends of the respective sections for angular transverse movement relative to each other, a spring strip disposed in said channel adjacent said bead and normally holding said sections in alignment, a strip of material comprising a water soluble substance having a relatively low freezing point disposed in the channel of at least the center section of said holder sections between said spring strip and the top wall of said section, the outer portions of the endmost holder sections constituting reservoirs for liquid, and a saddle having channeled ends embracing and pivotally connected to the outermost sections of the holder.

5. In a windshield wiper blade, a channeled holder having a plurality of aligned, flexibly jointed sections, each consisting of top, side and bottom walls defining an interior longitudinal channel and the bottom wall thereof having a longitudinal slot for receiving the neck of a flexible wiper strip, a wiper strip having a bead loosely disposed in the channels of said aligned sections and retained therein by said bottom walls, and a neck received in the slot thereof, and a strip of material comprising a water soluble substance having a freezing point, in solution, below that of water, disposed in the channel of at least one of said sections intermediate the top wall thereof and said bead.

6. In a windshield wiper blade, a channeled holder having a plurality of aligned, flexibly jointed sections, each consisting of top, side and bottom walls defining an interior longitudinal channel and the bottom wall thereof having a longitudinal slot for receiving the neck of a flexible wiper strip, a wiper strip having a bead loosely disposed in the channels of said aligned sections and retained therein by said bottom walls, and a neck received in the slot thereof, and a strip of absorbent material adapted to receive a water miscible liquid having a freezing point below that of water, disposed in the channel of at least one of said sections intermediate the top wall thereof and said bead.

7. In a windshield wiper blade, a channeled holder having a plurality of aligned, flexibly jointed sections, each consisting of top, side and bottom walls defining an interior longitudinal channel and the bottom wall thereof having a longitudinal slot for receiving the neck of a flexible wiper strip, a wiper strip having a bead loosely disposed in the channels of said sections and retained therein by said bottom walls, and a neck received in the slot thereof, and a strip of absorbent material substantially saturated with a water miscible liquid having a freezing point, in solution, below that of water, removably received in the channel of at least one of said sections intermediate the top wall thereof and said bead.

8. In a windshield wiper blade, a channeled holder having a plurality of aligned, flexibly jointed sections, each consisting of top, side and bottom walls defining an interior longitudinal channel and the bottom wall thereof having a longitudinal slot for receiving the neck of a flexible wiper strip, a wiper strip having a bead loosely disposed in the channels of said aligned sections and retained therein by said bottom walls, and a neck received in the slot thereof, and a block of water soluble crystalline material having a freezing point, in solution, below that of water, received in the channel of at least one of said sections intermediate the top wall thereof and said bead.

9. In a windshield wiper blade, a channel holder having three aligned, flexibly jointed sections, each consisting of top, side and bottom walls defining an interior longitudinal channel and the bottom wall thereof having a longitudinal slot for receiving the neck of a flexible wiper blade, a wiper strip having a bead loosely disposed in the channels of said sections and retained therein by said bottom walls, and a neck received in the slot thereof, a strip of absorbent material containing a water miscible liquid having a freezing point substantially below that of water disposed in the channel of the center section, and a block of water soluble crystalline material having a freezing point, in solution, below that of water, disposed in the channels of each of the endmost sections of the holder, said strip and said blocks being located between the top walls of the respective sections and said bead.

10. A windshield wiper blade comprising a channeled holder having a plurality of substantially rigid, elongate, aligned sections, each consisting of top, side and bottom walls defining an interior box-like channel extending from end to end of the blade, the respective bottom walls having communicating, longitudinal slots for receiving the neck of a flexible wiper strip, a wiper strip having a bead loosely disposed in the bottom of said channel and retained therein by said bottom walls, and having a neck received in said slots, means pivotally interconnecting the adjacent ends of the respective sections for angular movement relative to each other, resilient means disposed in said channel adjacent the top of said bead for normally holding said sections in alignment and yieldingly pressing said bead toward said bottom walls, a strip of material comprising a water soluble substance having a relatively low freezing point disposed in the channel of at least the center section of said holder intermediate the top wall thereof and said resilient means, the outer portions of the endmost holder sections constituting reservoirs for liquid or other material.

ISRAEL NESSON.

REFERENCES CITED

The following references are of record in the file of this patent:

UNITED STATES PATENTS

| Number | Name | Date |
|---|---|---|
| 1,828,715 | Oishei | Oct. 15, 1931 |
| 2,303,694 | Horton | Dec. 1, 1942 |

FOREIGN PATENTS

| Number | Country | Date |
|---|---|---|
| 427,383 | Great Britain | Apr. 23, 1935 |
| 820,156 | France | July 26, 1937 |

OTHER REFERENCES

Publication of Anderson Co., Gary, Ind., "Windshield Wipers," November 1, 1946, pages 2 and 3. (Copy in Div. 27.)